US010478905B2

(12) United States Patent
Eitel et al.

(10) Patent No.: US 10,478,905 B2
(45) Date of Patent: Nov. 19, 2019

(54) MACHINE TOOL FOR FORMING RADIATING CABLE (71) Applicant: Trilogy Communications, Inc., Pearl, MS (US)

(72) Inventors: Chris A. Eitel, Brandon, MS (US); Erwin Scott Cook, Brandon, MS (US); Craig L. Tetrick, Brandon, MS (US); R. Ryan Cole, Jackson, MS (US)

(73) Assignee: Trilogy Communications, Inc., Pearl, MS (US)

( * ) Notice: Subject to any disclaimer, the term of this patent is extended or adjusted under 35 U.S.C. 154(b) by 256 days.

(21) Appl. No.: 15/705,409

(22) Filed: Sep. 15, 2017

(65) Prior Publication Data

US 2018/0071837 A1  Mar. 15, 2018

Related U.S. Application Data (60) Provisional application No. 62/394,936, filed on Sep. 15, 2016.

(51) Int. Cl.
B23C 3/34 (2006.01)
B23C 3/00 (2006.01)
G05B 19/18 (2006.01)

(52) U.S. Cl.
CPC .............. B23C 3/34 (2013.01); B23C 3/002 (2013.01); G05B 19/182 (2013.01); B23C 2220/08 (2013.01); B23C 2220/36 (2013.01); G05B 2219/37355 (2013.01)

(58) Field of Classification Search
None
See application file for complete search history.

(56) References Cited

U.S. PATENT DOCUMENTS

| | | | | |
|---|---|---|---|---|
| 5,339,058 A | * | 8/1994 | Lique | H01Q 13/203 333/237 |
| 5,430,255 A | * | 7/1995 | Downie | H01B 7/0009 174/110 R |
| 5,543,000 A | | 8/1996 | Lique | |
| 5,705,967 A | * | 1/1998 | Pirard | H01Q 13/203 333/237 |
| 5,809,429 A | * | 9/1998 | Knop | H01Q 13/203 333/237 |
| 5,898,350 A | * | 4/1999 | Aberasturi | H01Q 13/203 333/237 |

(Continued)

Primary Examiner — Jeffry H Aftergut
(74) Attorney, Agent, or Firm — Fox Rothschild LLP (57) ABSTRACT A system for forming a radiating cable includes radiating machine tool having a cable receiving channel and a carriage. The carriage includes an aperture configured to align with the cable receiving channel, and a milling motor having a milling cutter. A radiating machine tool also includes a carriage receiving structure. A radiating machine is in communication with one or more controllers that receives a feeding speed associated with feeding a coaxial cable into the cable receiving channel, receives a pattern, determines a speed of rotation of the carriage by analyzing the feeding speed and the pattern, causes the carriage to rotate about the axis at the determined speed, and causes the milling cutter to perform one or more cutting actions to create one or more slots forming at least a portion of the pattern in an outer conductor of the coaxial cable.

19 Claims, 10 Drawing Sheets (56) References Cited

U.S. PATENT DOCUMENTS

| | | | | |
|---|---|---|---|---|
| 6,480,163 B1* | 11/2002 | Knop | ............... | H01Q 13/203 333/237 |
| 2011/0234338 A1* | 9/2011 | Takahashi | ............ | H01Q 13/203 333/237 |

* cited by examiner

MACHINE TOOL FOR FORMING RADIATING CABLE

CROSS-REFERENCE TO RELATED APPLICATIONS

This application claims priority to U.S. Provisional Patent Application No. 62/394,936, filed on Sep. 15, 2016, the entirety of which is included herein by reference.

BACKGROUND

Various types of radiating cables are used for transmission and propagation of electromagnetic signals. Radiating cables generally have a coaxial cable that includes an inner conductor surrounded by an outer conductor of tubular form, and a dielectric layer interposed between the two conductors. The outer conductor includes slots which generate an electromagnetic radiation. The outer conductor is covered by an insulating outer sheath.

The slots in the outer conductor may be of various types, for example a longitudinal slot over the entire length of the cable, or numerous small holes very close to each other. The radiating cables may operate in a "coupled mode" or a "radiated mode." In a coupled mode, the total length of the outer conductor includes slots that are separated by a distance considerably shorter than the wavelength of the radiated signal, and the radiated energy propagates in a direction parallel to the cable. With these cables, the signal received by a receiving antenna dissipates rapidly when the distance between the antenna and the cable increases, and the received signal fluctuates greatly when the receiving antenna is moved along a path parallel to the cable. In a radiated mode, the outer conductor includes groups of slots, which are reproduced with a constant spacing, this spacing being of the same order of magnitude as the wavelength of the signal to be radiated.

The outer conductor is typically prepared by punching holes in a suitable metal strip before folding the strip around the dielectric spacer. The pre-punched metal foil wrapped around the dielectric spacer is not welded and/or bonded. Moreover, a problem associated with the manufacture of radiating coaxial by wrapping the punched metal strip around the dielectric spacer is mechanical slot compression. During wrapping, the slots are compressed in the circumferential direction with respect to the cable causing the slots to become narrower. This mechanical slot compression results in less slot area through which the cable can emit or receive a signal. This impacts the efficiency of the radiating cable and mechanical strength.

The provision of slots in the outer conductor, before wrapping can affect the mechanical properties of the cable as well. For example, the slotted conductor metal sheet may be less resistant to kinking and crushing during handling and installation of the cable. Further, the resistance to environmental conditions such as moisture ingress into the dielectric core can also be reduced. Each of these problems may lead to electrical degradation of the cable.

SUMMARY

In an embodiment, a system for forming a radiating cable includes a radiating machine tool that includes a cable receiving channel and a carriage. The carriage includes an aperture configured to align with the cable receiving channel, and a milling motor having a milling cutter. A radiating machine tool also includes a carriage receiving structure. The carriage receiving structure is configured to engage an end of the carriage and cause the carriage to rotate about an axis that is coaxial with the cable receiving channel such that the milling cutter is oriented in a direction perpendicular to the axis. A radiating machine tool is in communication with one or more controllers. The one or more controllers are configured to receive a feeding speed associated with feeding a coaxial cable into the cable receiving channel, receive a pattern, determine a speed of rotation of the carriage by analyzing the feeding speed and the pattern, cause the carriage to rotate about the axis at the determined speed, and cause the milling cutter to perform one or more cutting actions to create one or more slots forming at least a portion of the pattern in an outer conductor of the coaxial cable.

Optionally, the one or more controllers may be configured to cause the milling cutter to perform one or more in-and-out movements.

The one or more controllers may be configured to cause the carriage receiving structure to move in a direction perpendicular to the axis.

In various embodiments, the carriage may include two milling motors that are disposed at diametrically opposite ends of the aperture. The carriage may be attached to the carriage receiving structure.

Optionally, the radiating machine tool may include one or more second carriages. Each of the second carriages may include a second aperture configured to align with the cable receiving channel, and a second milling motor comprising a second milling cutter. The carriage receiving structure may be further configured to engage an end of one or more of the second carriages and cause one or more of the second carriages to rotate about the axis such that the second milling cutter of the one or more second carriages is oriented in the direction perpendicular to the axis. In various embodiments, the controller may be configured to cause one or more of the second milling cutters to perform one or more cutting actions to create one or more slots forming at least a second portion of the pattern in an outer conductor of the coaxial cable. Rotation of the carriage and rotation of the one or more second carriages may be controlled independently of one another.

In an embodiment, a system for forming a radiating cable includes a radiating machine tool that includes a cable receiving channel and a plurality of carriages. Each carriage includes an aperture configured to align with the cable receiving channel, and a milling motor having a milling cutter. The radiating machine tool includes a carriage receiving structure configured to engage an end of each carriage and cause each carriage to rotate about an axis that is coaxial with the cable receiving channel such that the milling cutter of the carriage is oriented in a direction perpendicular to the axis. The radiating machine tool is in communication with one or more controllers. The one or more controllers are configured to receive a feeding speed associated with feeding a coaxial cable into the cable receiving channel, receive a pattern, determine a speed of rotation of the carriage by analyzing the feeding speed and the pattern, cause one or more of the carriages to rotate about the axis at the determined speed, and cause one or more of the milling cutters of the one or more carriages to perform one or more cutting actions to create one or more slots forming at least a portion of the pattern in an outer conductor of the coaxial cable.

Optionally, the one or more controllers may be configured to cause the carriage receiving structure to move in a direction perpendicular to the axis.

Optionally, each carriage may be attached to the carriage receiving structure. Rotation of carriages may be controlled independently of one another.

In an embodiment, a method of forming a radiating cable includes forming, by a radiating machine tool, a plurality of slots along a longitudinal length of an outer conductor of a coaxial cable by: receiving, by a cable receiving channel of the radiating machine tool, the coaxial cable, where the coaxial cable passes through an aperture of a carriage of the radiating machine tool, and causing, by a controller in communication with the radiating machine tool, the carriage to rotate about an axis that is coaxial with the cable receiving channel such that one or more milling cutters of the carriage form one or more of the plurality of slots along the longitudinal length of the outer conductor.

Optionally, the method further includes receiving a feeding speed associated with feeding the coaxial cable into the cable receiving channel, receiving a pattern, and determining a speed of rotation of the carriage by analyzing the feeding speed and the pattern. Causing the carriage to rotate about the axis may include causing the carriage to rotate about the axis at the determined speed.

Optionally, the method further includes receiving a pattern. Causing the carriage to rotate about the axis that is coaxial with the cable receiving channel such that one or more milling cutters of the carriage form one or more of the plurality of slots along the longitudinal length of the outer conductor may include causing the carriage to rotate about the axis such that one or more of the milling cutters performs one or more cutting actions to create the one or more slots forming at least a portion of the pattern.

The method may include providing an inner conductor, adding a dielectric spacer over the inner conductor, and forming the outer conductor disposed over the dielectric spacer to form the coaxial cable.

The method may include causing, by the controller, one or more second carriages to rotate about the axis such that one or more milling cutters of the second carriage form one or more of the plurality of slots along the longitudinal length of the outer conductor.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

When used in this document, terms such as "top" and "bottom," "upper" and "lower", or "front" and "rear," are not intended to have absolute orientations but are instead intended to describe relative positions of various components with respect to each other. For example, a first component may be an "upper" component and a second component may be a "lower" component when a light fixture is oriented in a first direction. The relative orientations of the components may be reversed, or the components may be on the same plane, if the orientation of a light fixture that contains the components is changed. The claims are intended to include all orientations of a device containing such components.

The terms "computer-readable storage medium," "data storage facility," and "memory" each refer to a non-transitory device on which computer-readable data, programming instructions or both are stored. Unless the context specifically states that a single device is required or that multiple devices are required, the terms "computer-readable storage medium," "data storage facility," and "memory" include both the singular and plural embodiments, as well as portions of such devices such as memory sectors.

In this document, the term "controller" refers to a control apparatus for controlling one or more mechanical units or devices of a machine tool. A controller may be a digital controller, an analog controller or circuit, an integrated circuit (IC), a programmable logic controller (PLC), a microcontroller, and/or the like. The term "controller" may refer to either a single controller or to multiple controllers that together implement various steps of a process. Unless the context specifically states that a single controller is required or that multiple controllers are required, the term "controller" includes both the singular and plural embodiments.

In this document, the terms "processor" and "processing device" refer to a hardware component of a controller or an electronic device that is configured to execute programming instructions. The term "processor" may refer to either a single processor or to multiple processors that together implement various steps of a process. Unless the context specifically states that a single processor is required or that multiple processors are required, the term "processor" includes both the singular and plural embodiments.

Figure 1:
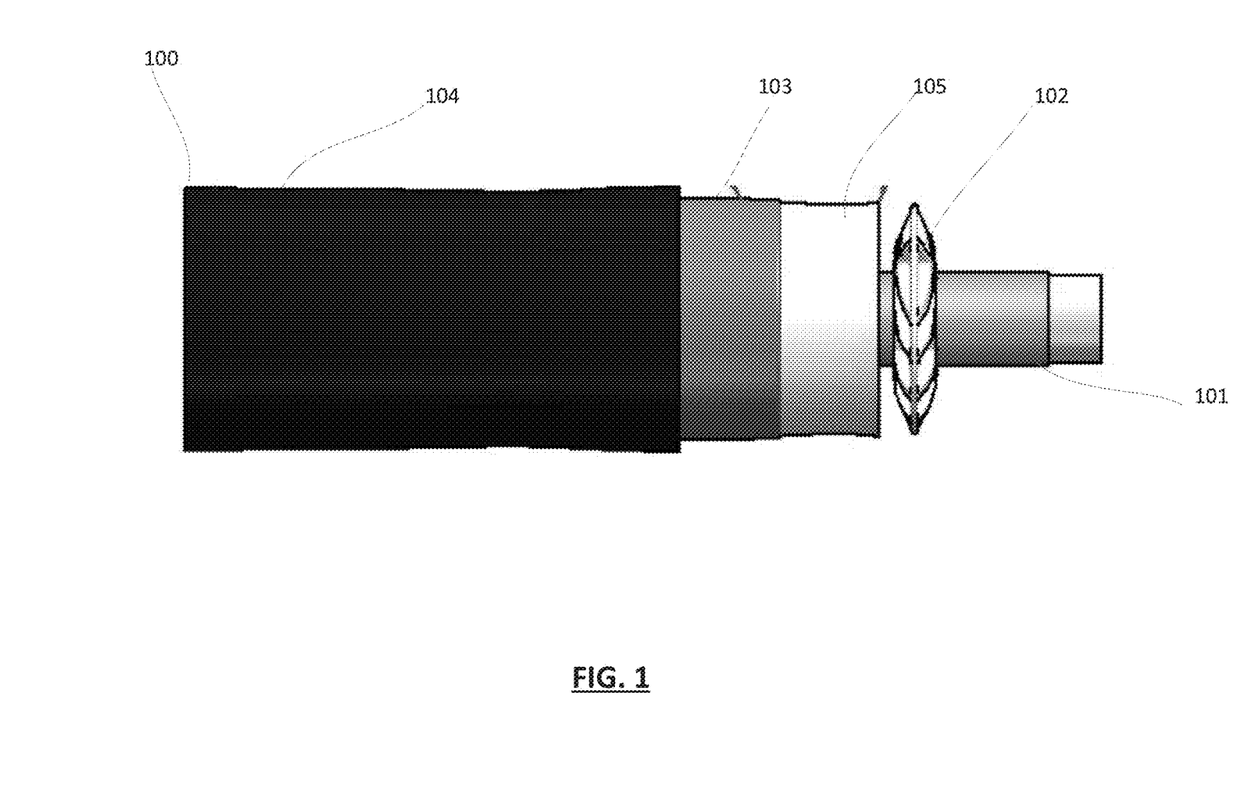
FIG. 1 illustrates a partially broken away side perspective view illustrating an example radiating coaxial cable, according to an embodiment.

As shown in FIG. 1, a radiating cable 100 may include a coaxial cable, having an inner conductor 101 that is surrounded by an outer conductor 103, and a dielectric material 102 disposed between the inner conductor 101 and the outer conductor 103. The inner conductor 101 may be formed from any electrically conducting material such as copper, aluminum, or copper plated steel, and may be provided in stranded wire or tubular form. The inner conductor 101 may be solid, hollow, stranded, corrugated, plated, clad, or the like. In an embodiment, the inner conductor 101 may be a copper-clad aluminum wire, such as for microwave coax applications. The outer conductor 103 may be formed from any electrically conductive material such as copper or aluminum, and defines the circumference of a radiating cable. A protective jacket 104 may surround outer conductor 103 to protect the contents of a radiating cable. Any insulating material may be used for jacket 104, such as, for example, rubber or non-conductive plastic.

In an embodiment, the inner conductor 101 and the outer conductor 103 may be separated by a dielectric material. For example, one or more circular disc-shaped spacers may be concentrically disposed at axial intervals about the inner conductor 101 to form the dielectric material such that the inner conductor 101 passes through an axial hole included in one or more of the one or more spacers. In an alternate embodiment, the dielectric spacer may be a continuous solid 102 such as a sheath between the inner conductor 101 and the outer conductor 103. The dielectric spacer may be formed from any suitable dielectric material such as polytetrafluorethylene or polyethylene (foamed or unfoamed), laminates, or any other material or combination of materials.

In an embodiment, the dielectric material may be surrounded by a sleeve that provides additional protection against moisture ingress, such as in cases where the outer insulating jacket of the cable is damaged.

Figure 2:
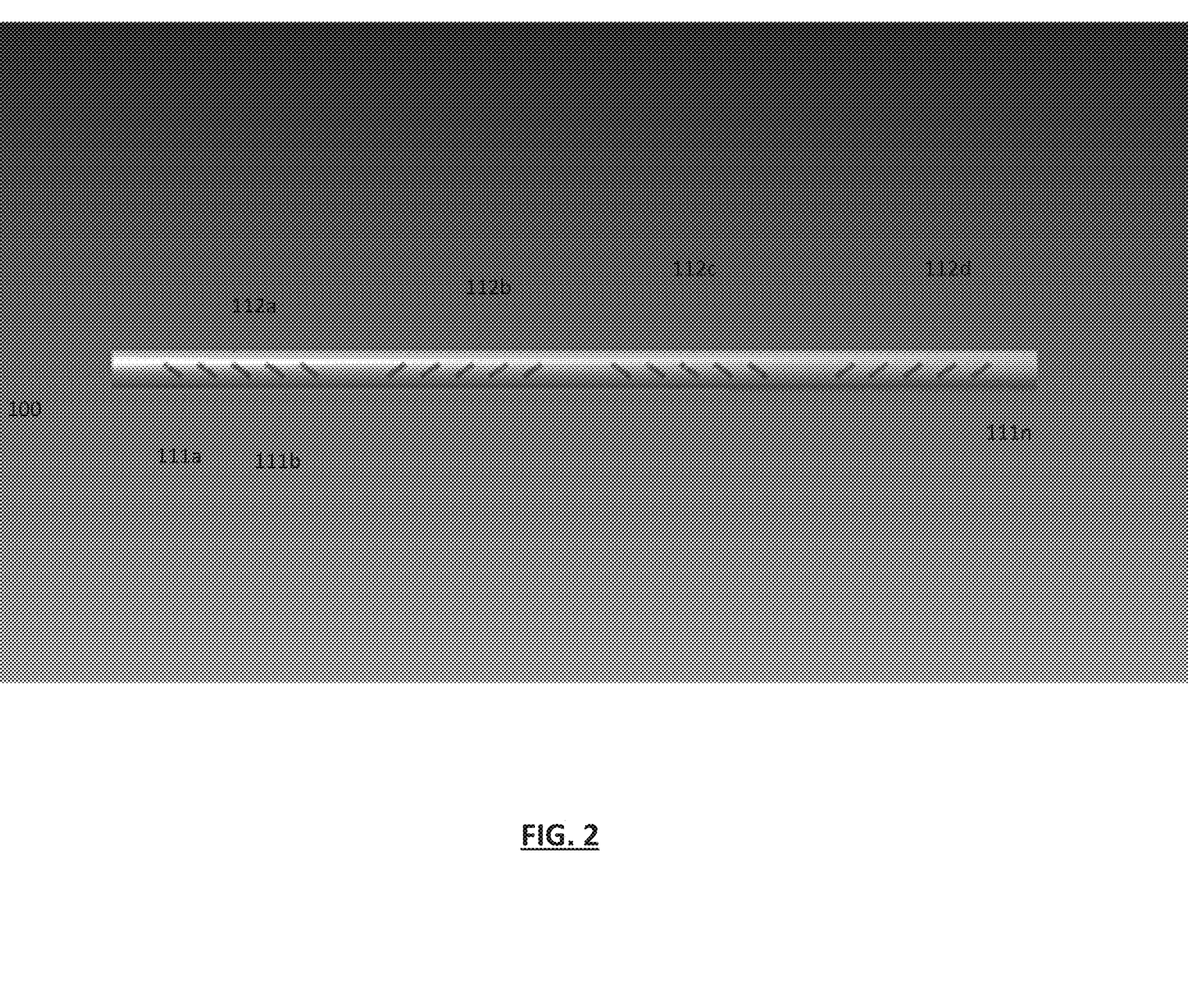
FIG. 2 illustrates a top view of example slot patterns created in an outer conductor of an example radiating coaxial cable, according to an embodiment.

In an embodiment, as shown in FIG. 2, the outer conductor 103 may include a plurality of slots 111a, 111b, . . . , 111n, spaced longitudinally from each other a uniform and/or variable distance D, along the length of the radiating cable such that they form one or more patterns 112a, 112b, 112c, 112d. The slots may be of any shape such as circular, rectangular, oval, or the like, and may extend at an oblique angle relative to a center axis C extending along the longitudinal center of the radiating cable 100. In an embodiment, the patterns of slots may be symmetrically arranged on diametrically opposite sides (in a direction perpendicular to the center axis C) of the radiating cable 100.

Figure 3:
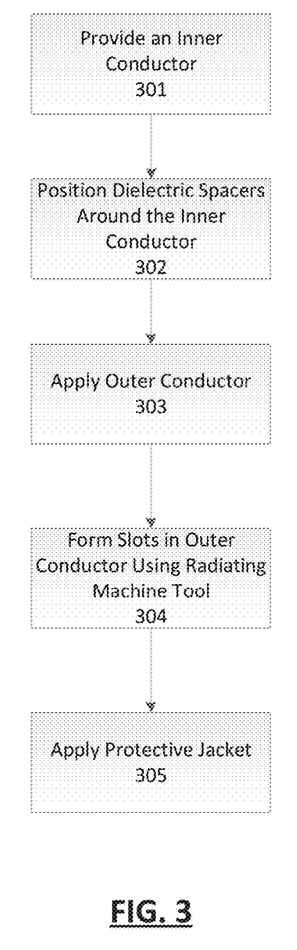
FIG. 3 illustrates a flowchart for an example method of manufacturing a radiating coaxial cable, according to an embodiment.

FIG. 3 illustrates a flowchart for an example method of manufacturing a radiating cable, such as the radiating cable of FIG. 1 or FIG. 2, according to an embodiment. As shown in FIG. 3, an inner conductor is provided in 301, and dielectric material may be positioned 302 around the inner conductor. In an embodiment, the dielectric material may be molded or extruded directly onto an inner conductor. For example, the inner conductor may be fed through an extruder where a pre-coat of an adhesive bonding agent is applied. The pre-coated inner conductor may then be fed through an extruder where the dielectric spacers are applied at predetermined positions around the inner conductor. Alternatively, the dielectric material may be molded in advance and positioned in the appropriate configuration around the inner conductor. In an embodiment, the inner conductor may be heated before application of the adhesive bonding to an elevated temperature to remove moisture or other contaminants on the surface of the conductor. In an embodiment, an optional insulating sleeve may be extruded or otherwise formed over the dielectric material. In an embodiment, heat from the extrusion process may create a heat bond between the sleeve and the dielectric material. In an alternate embodiment, an adhesive bonding agent may be applied on the circumference of the dielectric material.

In step 303, an outer conductor may be drawn, helically wound, longitudinally pulled (cigarette wrapped), braided, extruded, plated, or applied using any now or hereafter known methods, over the dielectric material to form a coaxial cable. For example, in an embodiment, the inner conductor surrounded by the dielectric material may be fed through an extruder where a pre-coat of an adhesive bonding agent is applied over the dielectric material. The pre-coated structure may then be fed through an extruder where the outer conductor is applied. In an alternate embodiment, a strip of the outer conductor may be seam welded (such as using a high-speed welding process) into a tubular configuration, which is then drawn over the dielectric material in a continuous process.

In step 304, a plurality of slots may be formed into the outer conductor using a radiating machine tool. In an embodiment, any waste material created during formation of the slots may be removed using methods such as suction, blowing, and/or the like. The radiating machine tool may be configured to cut slots in the outer conductor that can be of a desired width, length or angle in either a linear or a non-linear mode.

Figure 4A:
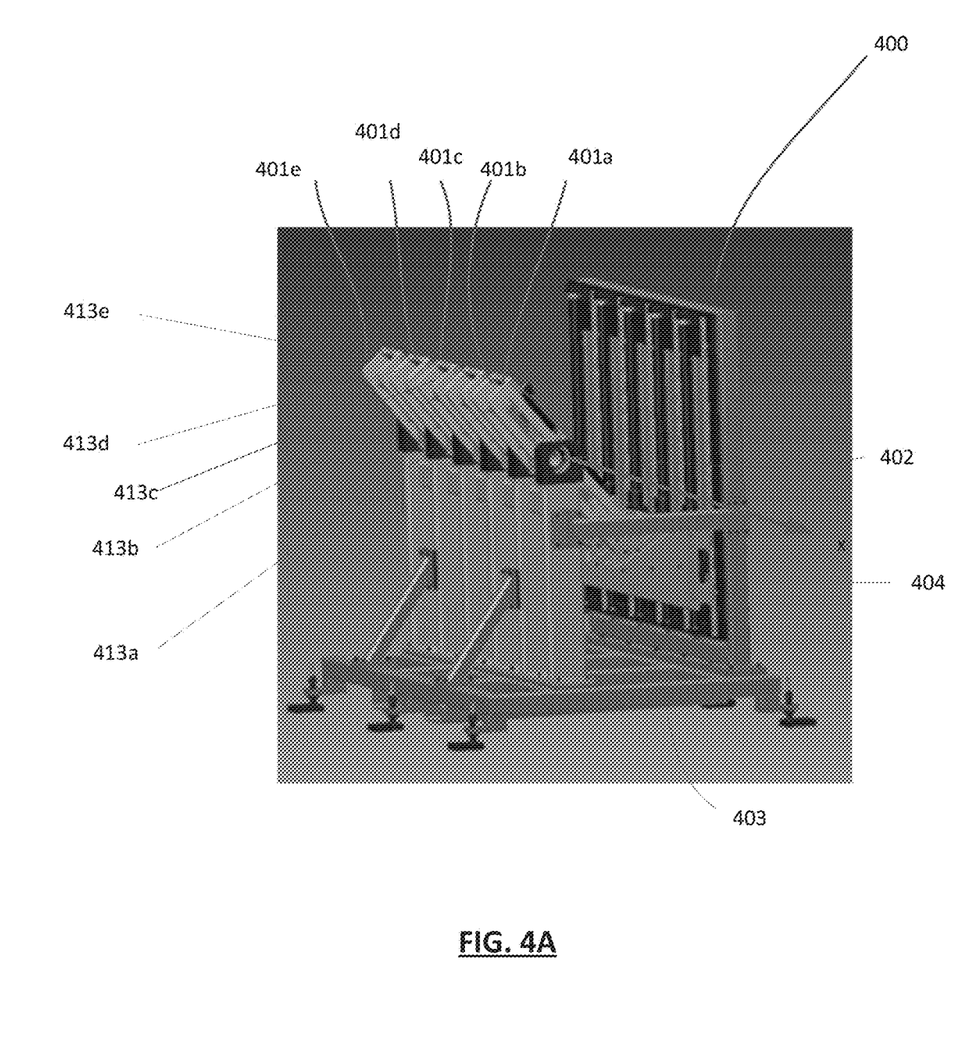
FIG. 4A and FIG. 4B illustrate a schematic front perspective view of an example radiating machine tool, according to an embodiment.
Figure 4B:
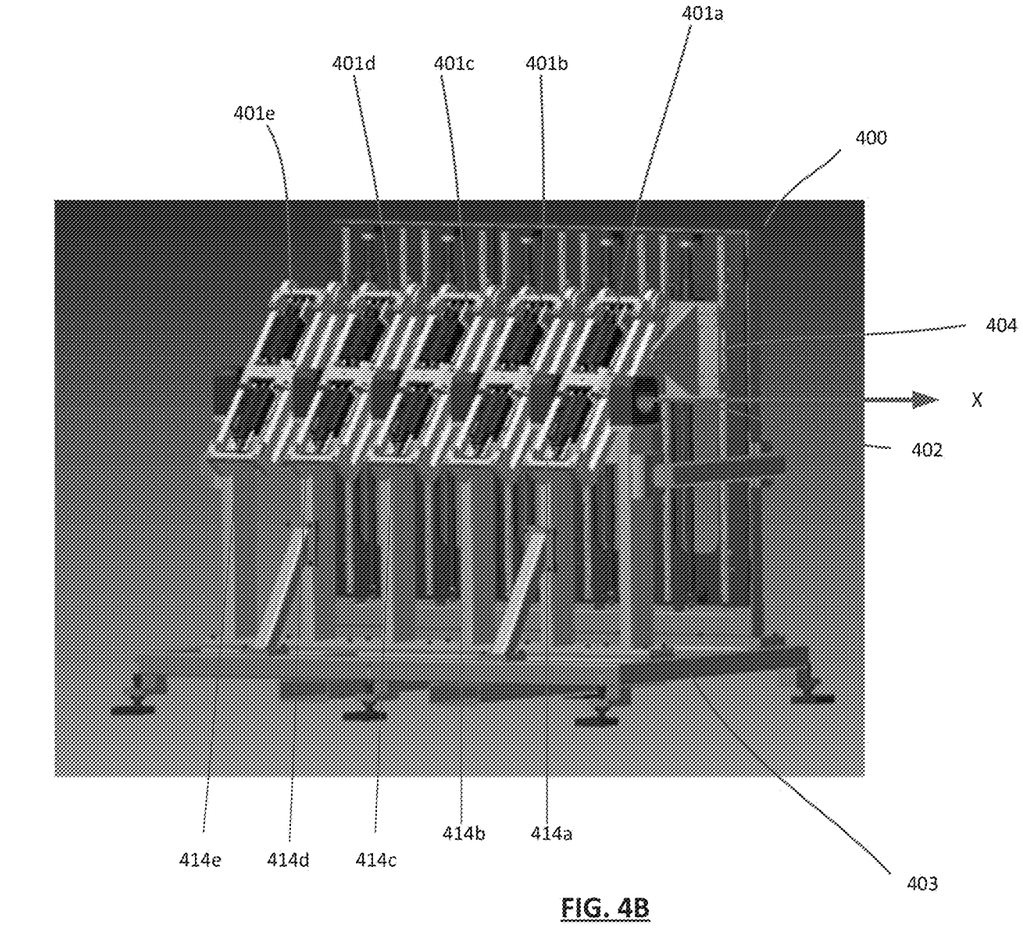

FIG. 4A and FIG. 4B illustrate front perspective views of an example radiating machine tool. A radiating machine tool may be in communication with a controller that is configured to operate the radiating machine tool in a desired manner. For instance, a controller (or a computer-readable storage medium associated with a controller) may be programmed with one or more instructions that, when executed, causes the controller to cause the machine tool to perform an action (or a partial action) such as selecting a particular component, positioning a component or the coaxial cable, setting a rate of movement (speed and/or acceleration) of the component or the coaxial cable, setting a direction of movement of the component or the coaxial cable, and/or the like. In an embodiment, the controller may access drives that run the motors of one or more components on the radiating machine tool, and may provide the digital and analog inputs to create the desired movements. As shown in FIG. 4F, a controller 420 may be in communication with a machine tool 400 over a communication network 422. A communication network may be a wired or wireless communication network.

n various embodiments, one or more controllers 420 may be in communication with an electronic device 421 such as, for example, a desktop computer, a laptop computer, a tablet, a mobile device and/or the like. A controller 420 may communicate with an electronic device 421 via a communication network 423. In an embodiment, a user may utilize an electronic device to adjust, change, or update the programming of one or more controllers.

As shown in FIG. 4A and FIG. 4B, the radiating machine tool 400 may include one or more carriages 401a, 401b, 401c, 401d, 401e configured to rotate around a longitudinal axis (X-axis) of a cable receiving channel 402 of the radiating machine tool. In an embodiment, a cable receiving channel 402 includes one or more cable receiving apertures (not shown here).

Figure 4C:
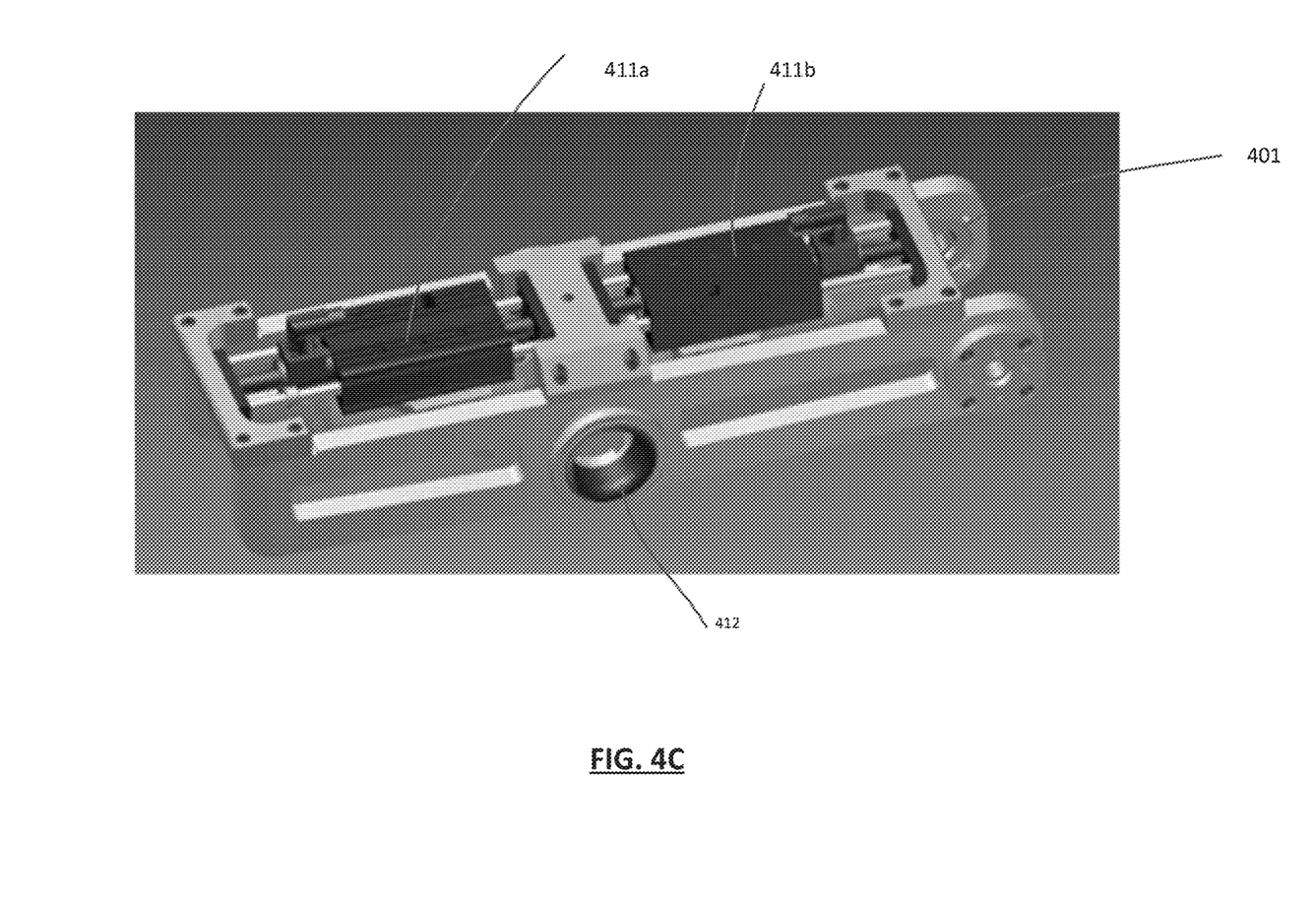
FIGS. 4C and 4D illustrate different views of a carriage of an example radiating machine tool, according to an embodiment.
Figure 4D:
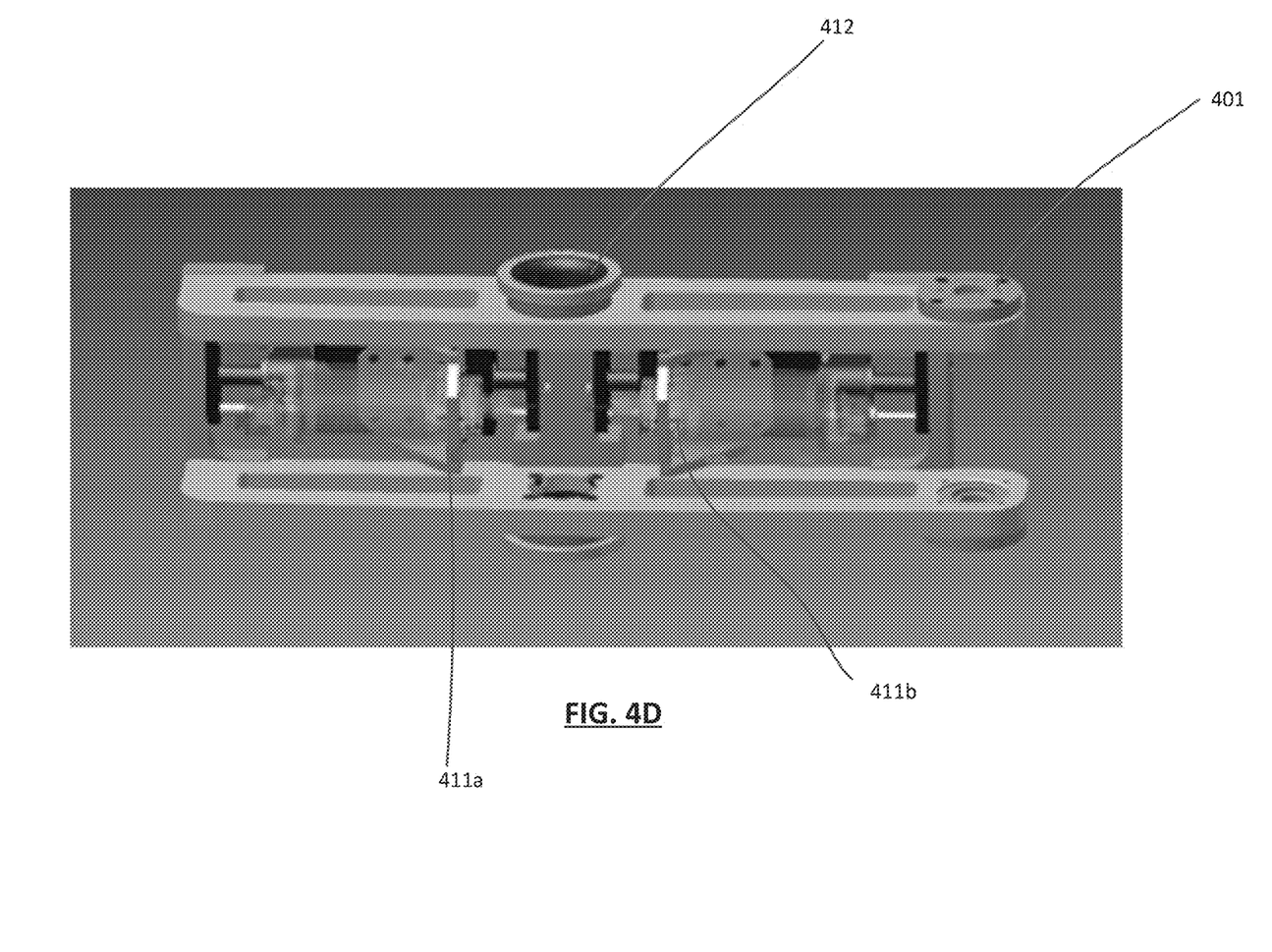

As shown in FIG. 4C and FIG. 4D, each carriage 401 may also include an aperture 412, and one or more milling motors 411a and 411b (each including a milling cutter or bit, not shown here). In an embodiment, a milling cutter or a milling bit may be directly received into the milling motor. Alternatively and/or additionally, a milling motor may include and/or be in communication with a milling head that received the milling cutter or milling bit. In an embodiment, the milling motors 411a and 411b may be positioned diametrically opposite to each other, and may be independently controlled to move in or out of a cutting position. In an alternate embodiment, a carriage may include only one milling motor configured to cut slots on one side of a coaxial cable. A carriage 401 is configured to be attached to the radiating machine tool 400 such that the cable receiving apertures of the cable receiving channel 402 and the aperture 412 of the carriage 401 are aligned and/or concentric (i.e., the center of the aperture 412 coincides with the longitudinal axis (X-axis) of the cable receiving channel 402). In an embodiment, the cable receiving channel 402 and aperture 412 of the carriage 401 may substantially have the same circumferential diameter. Hence, in an embodiment, a coaxial cable may be fed through the cable receiving channel 402 such that it passes through an aperture 412 of carriage 401 attached to the radiating machine tool 400. A milling cutter may project within the cable receiving channel 402 and/or the aperture 412 when its milling motor is in a cutting position, and may be configured to form slots of a desired width in the outer conductor through one or more cutting actions such as, for example, in-and-out movements.

Referring back to FIG. 4A and FIG. 4B, the carriages 401a, 401b, 401c, 401d, 401e may be attached to a supporting structure 403, such that each carriage has a free end (413a, 413b, 413c, 413d, 413e), and an end (414a, 414b, 414c, 414d, 414e) configured to be attached to a corresponding moveable carriage receiving structure 404 (separate for each carriage, but not shown here) of the supporting structure 403. Each carriage receiving structure 404 may move in a direction perpendicular to the longitudinal axis of the cable receiving channel 402, such that movement of a carriage receiving structure 404 causes the attached corresponding carriage to rotate about an axis that is coaxial with the longitudinal axis of cable receiving channel 402. Rotation of a carriage may be controlled independently of the other carriages. In an embodiment, a milling motor of a carriage may be configured to be included in the carriage such that its milling cutter is orientated in a direction perpendicular to the X-axis and this orientation is maintained during rotation of the carriage. Hence, the depth of a slot formed is kept uniform and is controlled such that the slots are only formed in the outer conductor of the coaxial cable.

Figure 4E:
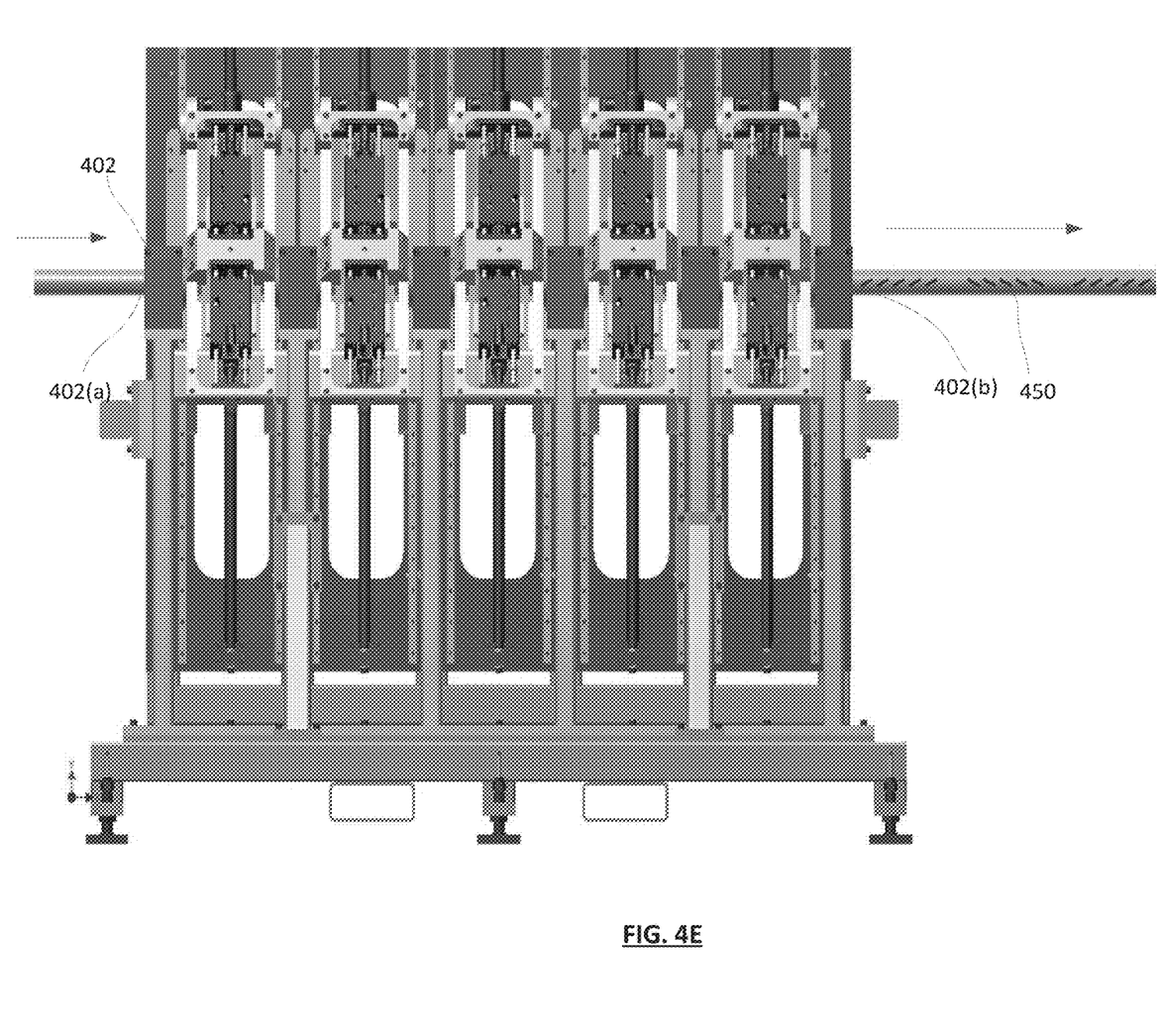
FIG. 4E illustrates a front view of an example radiating machine tool in which a coaxial cable is fed through a channel, according to an embodiment.
Figure 4F:
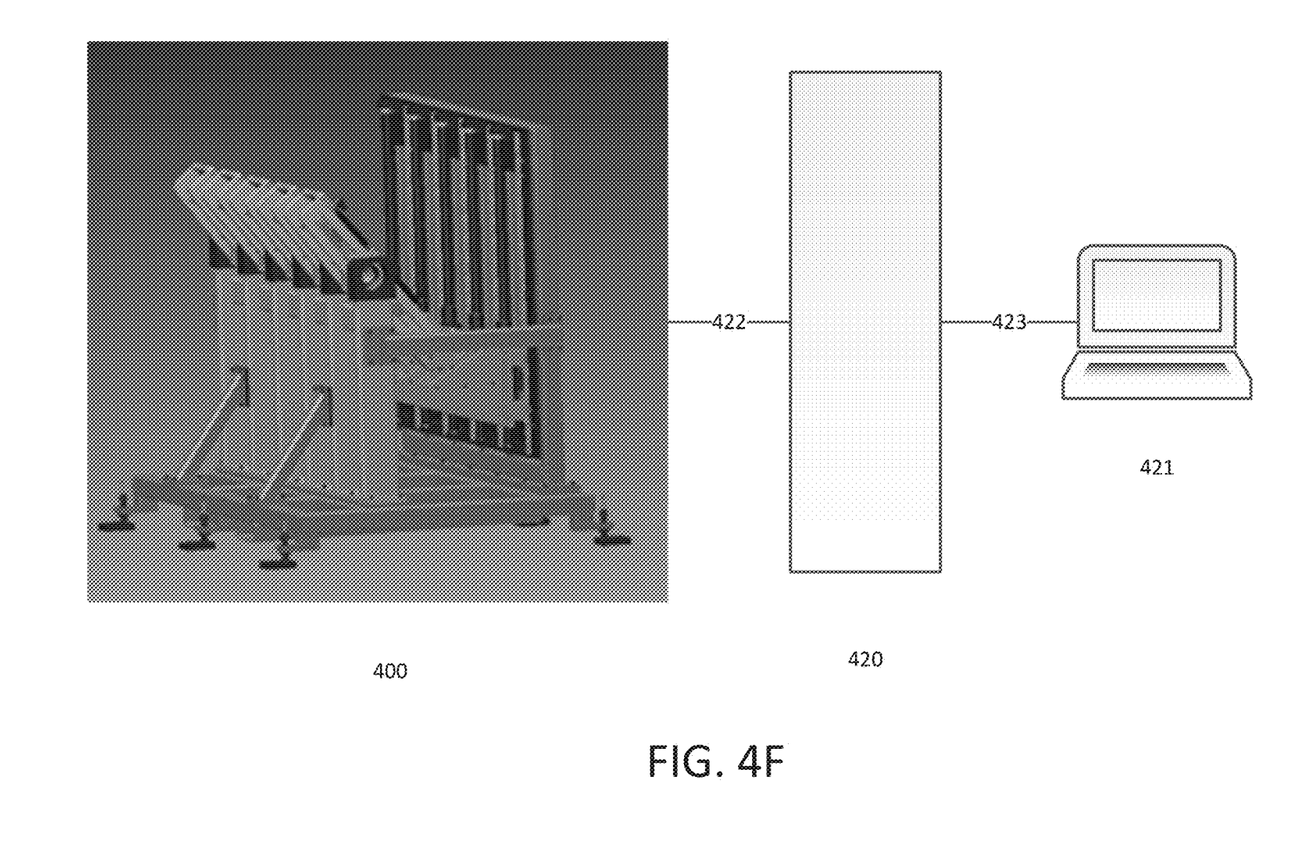
FIG. 4F illustrates an example system according to an embodiment.

In an embodiment, a coaxial cable 450 with an outer conductor may be fed into a receiving end 402(a) of the cable receiving channel 402 at a controlled speed to obtain a coaxial cable with slots of a desired pattern formed in the outer conductor from the output end 402(b) as shown in FIG. 4E. A controller associated with the radiating machine tool may be configured to control the feeding speed of the coaxial cable. For example, a wheel or a belt may be configured to be in physical contact with the moving coaxial cable (while being fed into the cable receiving channel) and may be used to determine a feeding speed of the coaxial cable. That determined feeding speed may be used by the controller as feedback to control power input to a pulling mechanism (such as capstans) that pulls a radiating cable into the cable receiving channel in order to control the feeding speed of the coaxial cable. In an embodiment, the controller may use the feeding speed of the coaxial cable in conjunction with a pattern associated with the plurality of slots to be formed as input to provide suitable instructions to the radiating machine tool to create the pattern. In various embodiments, a controller may receive a pattern of slots to create on at least a portion of a coaxial cable. For instance, in an embodiment, a controller may receive a pattern from memory such as, for example, in response to a selection of a desired pattern by an operator. Specifically, the controller may control the location, length, angle, or other parameters of each cut in a pattern by controlling the movement of one or more carriage receiving structures 404 and speed at which the milling motors will form slots in the outer conductor. For example, the controller may determine a speed of rotation of each carriage of the radiating machine tool based on the feeding speed of the coaxial cable and the desired pattern of slots, and control the movement of the corresponding carriage receiving structures to cause each carriage to rotate at its determined speed.

In an embodiment, the controller may also control the movement of the milling motors of each carriage to control engagement and disengagement of the milling cutters. In an embodiment, the controller may cause the radiating machine tool to form a plurality of slots in the outer conductor, in one or more desired patterns, by controlling the feeding speed, the speed at which the milling motors will form slots, and/or engagement and disengagement of the milling cutters.

In an embodiment, the controller may include a processing device that is in electronic communication with one or more other components of the machine radiating tool. A controller may also include a memory that stores one or more programming instructions that when executed cause the controller to control movement of one or more components of the machine radiating tool to form the plurality of slots in one or more desired patterns. For instance, various rule sets that include information relating to one or more slot patterns (including length, width, and angle of slots, design of patterns, etc.); the movement of one or more components of the machine radiating tool required to create a slot pattern; and the corresponding one or more programming instructions that when executed cause the controller to control movement of one or more components of the machine radiating tool may be stored in memory. The controller may receive a desired slot pattern of slots to be created, and may access the memory to select the appropriate programming instructions to control movement of one or more components of the machine radiating tool to create the desired design pattern.

Figure 5:
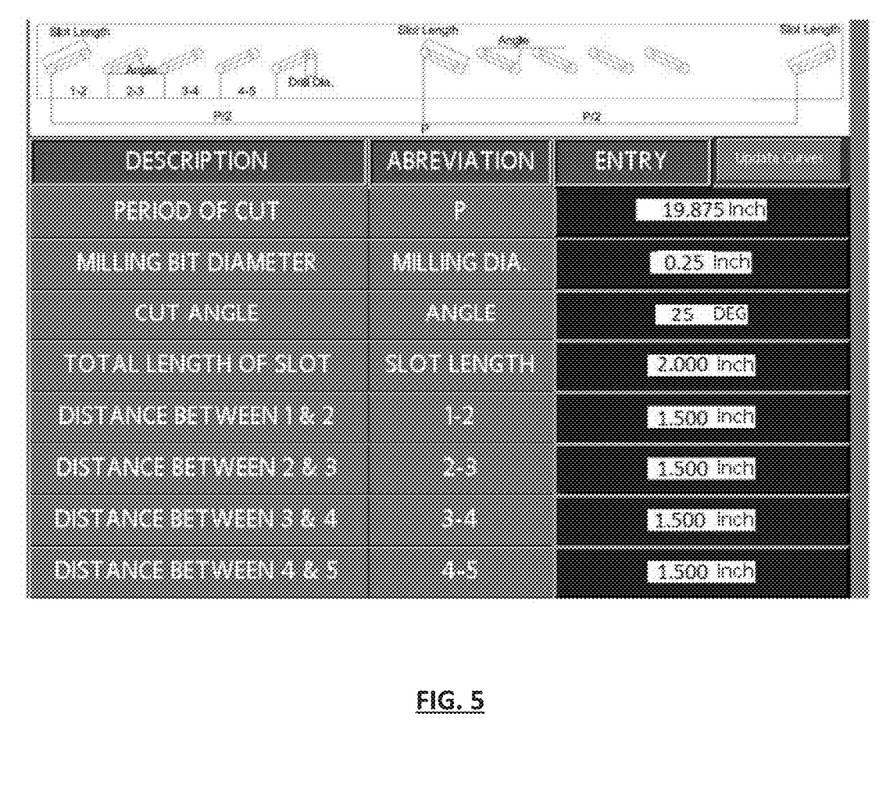
FIG. 5 illustrates example parameters and associated values for creating the slot design of FIG. 2, according to an embodiment.

FIG. 5 illustrates example parameters and associated values for creating the slot design of FIG. 2. Values for various parameters such as a period of cut, diameter of a milling bit, cut angle, length of a slot, and distances between slots may be provided by a user and/or derived by the controller using a rule set corresponding to a desired slot design. The various parameters and their corresponding values provided in FIG. 5 are by way of example only and are not limiting. Additional and/or alternate parameters, values and slot designs may be used within the scope of this disclosure.

Referring back to FIG. 3, in step 305, a protective jacket may be applied to the slotted outer conductor using known processes such as extrusion, lamination, or the like. In an embodiment, more than one jacket may be applied to the slotted outer conductor to improve the fire rating of a coaxial cable. In an embodiment, a bonding agent may be applied on the outer surface of the outer conductor prior to application of the protective jacket. In an alternate embodiment, the extruded jacket material at high temperature may the surface of the insulating sleeve, via the slotted regions, and form a durable bond with the insulating sleeve.

The features and functions described above, as well as alternatives, may be combined into many other systems or applications. Various presently unforeseen or unanticipated alternatives, modifications, variations or improvements may be made by those skilled in the art, each of which is also intended to be encompassed by the disclosed embodiments.

The invention claimed is:
1. A system for forming a radiating cable, the system comprising:
    a radiating machine tool comprising:
        a cable receiving channel,
        a carriage comprising:
            an aperture configured to align with the cable receiving channel, and
            a milling motor comprising a milling cutter, and a carriage receiving structure configured to engage an end of the carriage and cause the carriage to rotate about an axis that is coaxial with the cable receiving channel such that the milling cutter is oriented in a direction perpendicular to the axis; and one or more controllers in communication with the radiating machine tool, wherein the one or more controllers are configured to:
receive a feeding speed associated with feeding a coaxial cable into the cable receiving channel,
receive a pattern,
determine a speed of rotation of the carriage by analyzing the feeding speed and the pattern,
cause the carriage to rotate about the axis at the determined speed, and
cause the milling cutter to perform one or more cutting actions to create one or more slots forming at least a portion of the pattern in an outer conductor of the coaxial cable.

2. The system of claim 1, wherein the one or more controllers are configured to cause the milling cutter to perform one or more in-and-out movements.

3. The system of claim 1, wherein the one or more controllers are configured to cause the carriage receiving structure to move in a direction perpendicular to the axis.

4. The system of claim 1, wherein the carriage comprises two milling motors disposed at diametrically opposite ends of the aperture.

5. The system of claim 1, wherein the carriage is attached to the carriage receiving structure.

6. The system of claim 1, further comprising one or more second carriages.

7. The system of claim 6, wherein each of the second carriages comprises:
a second aperture configured to align with the cable receiving channel, and
a second milling motor comprising a second milling cutter.

8. The system of claim 7, wherein the carriage receiving structure is further configured to engage an end of one or more of the second carriages and cause one or more of the second carriages to rotate about the axis such that the second milling cutter of the one or more second carriages is oriented in the direction perpendicular to the axis.

9. The system of claim 7, wherein the one or more controllers are configured to cause one or more of the second milling cutters to perform one or more cutting actions to create one or more slots forming at least a second portion of the pattern in an outer conductor of the coaxial cable.

10. The system of claim 8, wherein rotation of the carriage and rotation of the one or more second carriages are controlled independently of one another.

11. A system for forming a radiating cable, comprising:
a radiating machine tool comprising:
a cable receiving channel,
a plurality of carriages, wherein each carriage comprises:
an aperture configured to align with the cable receiving channel, and
a milling motor comprising a milling cutter, and
a carriage receiving structure configured to engage an end of each carriage and cause each carriage to rotate about an axis that is coaxial with the cable receiving channel such that the milling cutter of the carriage is oriented in a direction perpendicular to the axis; and one or more controllers in communication with the radiating machine tool, wherein the one or more controllers are configured to:
receive a feeding speed associated with feeding a coaxial cable into the cable receiving channel,
receive a pattern,
determine a speed of rotation of the carriage by analyzing the feeding speed and the pattern,
cause one or more of the plurality of carriages to rotate about the axis at the determined speed, and
cause one or more of the milling cutters of the one or more of the plurality of carriages to perform one or more cutting actions to create one or more slots forming at least a portion of the pattern in an outer conductor of the coaxial cable.

12. The system of claim 11, wherein the one or more controllers are configured to cause one or more of the carriages to rotate about the axis comprise one or more programming instructions that, when executed, cause the controller to cause the carriage receiving structure to move in a direction perpendicular to the axis.

13. The system of claim 11, wherein each carriage is attached to the carriage receiving structure.

14. The system of claim 11, wherein rotation of carriages are controlled independently of one another.

15. A method of forming a radiating cable, comprising:
forming, by a radiating machine tool, a plurality of slots along a longitudinal length of an outer conductor of a coaxial cable by:
receiving, by a cable receiving channel of the radiating machine tool, the coaxial cable, wherein the coaxial cable passes through an aperture of a carriage of the radiating machine tool, and
causing, by a controller in communication with the radiating machine tool, the carriage to rotate about an axis that is coaxial with the cable receiving channel such that one or more milling cutters of the carriage form one or more of the plurality of slots along the longitudinal length of the outer conductor.

16. The method of claim 15, further comprising:
receiving a feeding speed associated with feeding the coaxial cable into the cable receiving channel;
receiving a pattern; and
determining a speed of rotation of the carriage by analyzing the feeding speed and the pattern,
wherein causing the carriage to rotate about the axis comprises causing the carriage to rotate about the axis at the determined speed.

17. The method of claim 15, further comprising receiving a pattern, wherein causing the carriage to rotate about the axis that is coaxial with the cable receiving channel such that one or more milling cutters of the carriage form one or more of the plurality of slots along the longitudinal length of the outer conductor comprises causing the carriage to rotate about the axis such that one or more of the milling cutters performs one or more cutting actions to create the one or more slots forming at least a portion of the pattern.

18. The method of claim 15, further comprising:
providing an inner conductor;
adding a dielectric spacer over the inner conductor; and
forming the outer conductor disposed over the dielectric spacer to form the coaxial cable.

19. The method of claim 15, further comprising:
causing, by the controller, one or more second carriages to rotate about the axis such that one or more milling cutters of the second carriage form one or more of the plurality of slots along the longitudinal length of the outer conductor.

* * * * *